United States Patent [19]

Fujino

[11] Patent Number: 4,895,234
[45] Date of Patent: Jan. 23, 1990

[54] UNIDIRECTIONAL ROTARY CLUTCH IN STARTER MOTOR

[75] Inventor: Ikuo Fujino, Ashikaga, Japan

[73] Assignee: Mitsuba Electric Mfg. Co., Ltd., Gumma, Japan

[21] Appl. No.: 289,674

[22] Filed: Dec. 27, 1988

[30] Foreign Application Priority Data

Dec. 28, 1987 [JP] Japan .................. 62-329735

[51] Int. Cl.$^4$ .......................................... F16D 41/07
[52] U.S. Cl. ................................. 192/42; 74/7 C; 192/45; 192/113 R
[58] Field of Search .................. 192/42, 63, 45, 113 R, 192/113 B; 74/7 C

[56] References Cited

U.S. PATENT DOCUMENTS

| | | |
|---|---|---|
| 3,460,655 | 8/1969 | Bowcott . |
| 3,691,854 | 9/1972 | Barthruff . |
| 3,750,782 | 8/1973 | Costantini et al. . |
| 3,760,914 | 9/1973 | Gelbrich . |
| 3,820,406 | 6/1974 | Touller . |
| 3,965,754 | 6/1976 | Bowcott . |
| 3,967,507 | 7/1976 | Emms . |
| 3,990,555 | 11/1976 | Carullo . |
| 4,178,805 | 12/1979 | Mazzorana . |
| 4,192,195 | 3/1980 | Kazino et al. . |
| 4,197,885 | 4/1980 | Mortensen . |
| 4,394,279 | 7/1983 | de Vries et al. ............ 252/46.4 |
| 4,537,696 | 8/1985 | Beimesch .............. 252/51.5 A X |
| 4,587,861 | 5/1986 | Morishita . |
| 4,717,541 | 1/1988 | Baseman ................ 252/34 X |
| 4,776,969 | 10/1988 | Ryer et al. ............... 252/46.7 |

FOREIGN PATENT DOCUMENTS 2089495 5/1982 United Kingdom ............ 192/45

Primary Examiner—Rodney H. Bonck
Attorney, Agent, or Firm—Oliff & Berridge

[57] ABSTRACT

A unidirectional rotary clutch in a starter motor has a clutch inner interlocking with a motor, a clutch outer interlocking with a pinion gear and an elastic member-fitted clutch roller accommodated in a roller groove chamber. The clutch functions to propagate power driving forward rotation of the motor, but to cut off the propagation of power in the case of reverse rotation. The chamber is filled with grease mainly composed of hydrocarbon fats and oils to which 5.0 to 15.0% by weight of a fluorocarbon resinous agent is added.

2 Claims, 1 Drawing Sheet

UNIDIRECTIONAL ROTARY CLUTCH IN STARTER MOTOR

The present invention is directed to a unidirectional rotary clutch in a starter motor for starting an engine.

One typical arrangement of the above-mentioned starter motor is that between a clutch inner and a clutch outer which respectively interlock with a motor unit and a pinion gear there is formed a roller groove chamber for accommodating a clutch roller, thus constituting a unidirectional rotary clutch. Based on this construction, no load is imparted from the engine to the motor unit. In this type of unidirectional rotary clutch, however, the roller groove chamber is filled with grease for smoothening the operation of the clutch. When starting the engine, the engine rotates at a higher velocity than that of the motor unit, with the result that the starter motor incurs an overrun. An unnecessary load is prevented from acting on the motor unit by power cutoff action of the unidirectional rotary clutch. In order to achieve lubricity at this time, there exist strict restrictions in setting dimensional elements such as an inclined angle of a tapered surface in the roller groove chamber, a diameter of the roller and an outside diameter of the clutch inner. Under actual circumstances, these restrictions further lead to a wide variety of constraints with regard to degree of freedom in design, control over the accuracy of products and so on. It is therefore highly desirable that such disadvantages be ameliorated.

BRIEF SUMMARY OF THE INVENTION

It is a primary object of the present invention, inspired by the above circumstances, to provide a unidirectional rotary clutch in a starter motor which is capable of obviating the foregoing defects.

To this end, according to one aspect of the invention, there is provided a unidirectional rotary clutch in a starter motor comprising: a clutch inner connectively interlocking with a motor unit on a power conveying route leading from the motor unit to a pinion gear engaging with a ring gear, in a disengageable manner, provided on the side of an engine; a clutch outer connectively interlocking with the pinion gear; and an elastic member-fitted clutch roller incorporated into a roller groove chamber formed between the clutch inner and the clutch outer; the unidirectional rotary clutch functioning to propagate the power in the case of forward rotation applies to the motor unit but cut off the propagation of power in the case of reverse rotation, and characterized by grease filling the roller groove chamber, the grease being composed of hydrocarbon fats and oils as a primary component and fluorocarbon resinous agent added thereto as a secondary component.

In accordance with the present invention, the primary component of grease involves the use of well-known hydrocarbon fats and oils utilized for general purpose. In this case, as a matter of course, it is preferable to obtain required lubricity by providing the primary component to with organic molybdenum disulfide compound such as molybdenum dithiocarbamate or the like.

Fluorocarbon resinous agent is of course a solid substance within a range of working temperatures. However, resinous agents may be used solely or in combination, such resinous agents including tetrafluoroethylene resin, fluoroethylene-propylene resin, perfluoroalkoxy resin, side-chain tetrafluoroethylene resin or the like. Moreover, the amount of fluorocarbon resinous agent added is not particularly limitative but may be adjusted depending on the conditions. Under normal working conditions, however, the amount of fluorocarbon resinous agent added preferably ranges from 5.0 to 15.0% by weight, more preferably 10% by weight with respect to the hydrocarbon component.

The present invention is constituted in the manner discussed above, wherein it is possible to effectively cope with a phenomenon associated with overrun due to starting of the engine. Furthermore, there are yielded a wide variety of useful effects which will hereinafter be mentioned. The action of the added fluorocarbon resinous agent provides well-maintained lubricity between the clutch roller, clutch outer and clutch inner, which in turn contributes to a remarkable improvement of durability. In addition, it is feasible to flexibly set the dimensional elements such as a tapered angle in the roller groove chamber, the roller diameter and the outside diameter of the clutch inner. This permits an expansion of degree of freedom in design and also simplifies control over the accuracy of products.

Thus, the above-described excellent effects can be provided by employing grease, to which fluorocarbon resinous agent is added, in the unidirectional rotary clutch for use with the starter motor. The scientific reason for this is not yet established, but will be clarified by research and study from now on into the future. One assumption is, however, that the added fluorocarbon resinous agent is stable regardless of variations in temperature and has minimal frictional constant and adhesion resistance property, and the foregoing effects may be derived from these characteristics.

BRIEF DESCRIPTION OF THE DRAWINGS

Other objects and advantages of the invention will become more apparent during the following discussion in conjunction with the accompanying drawings, in which.

The drawings in combination show one embodiment of a unidirectional rotary clutch in a starter motor according to the present invention.

DETAILED DESCRIPTION OF THE PREFERRED EMBODIMENT

Figure 1:
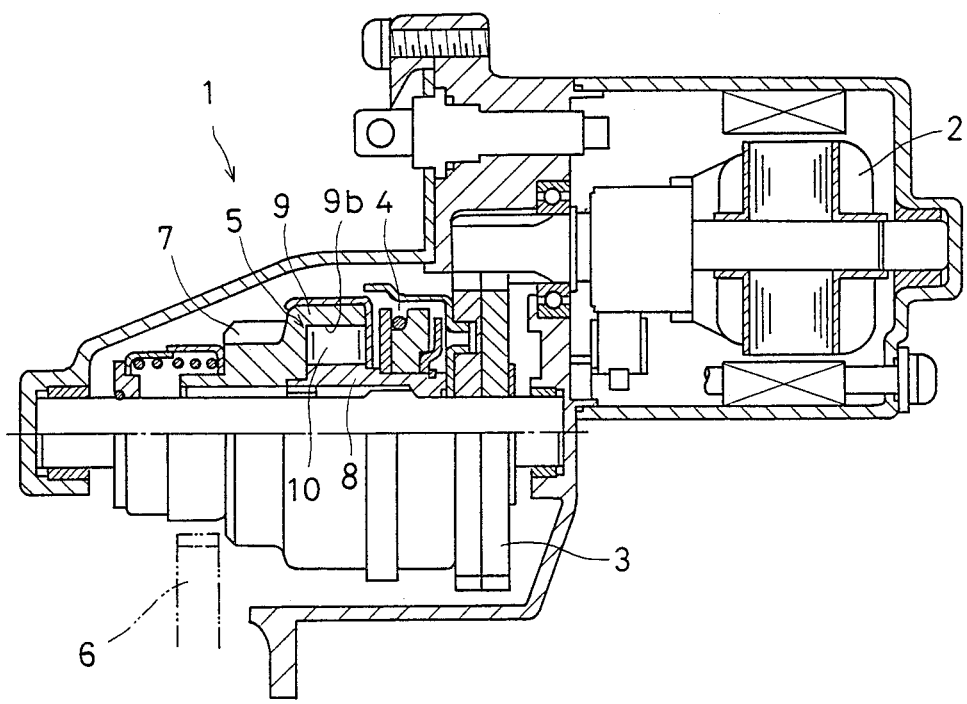
FIG. 1 is a side sectional view illustrating the starter motor.
Figure 2:
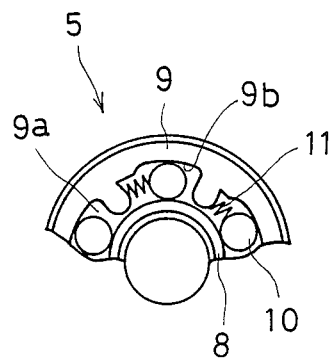
FIG. 2 is a sectional view depicting the principal portion of the unidirectional rotary clutch.

One embodiment of the present invention will hereinafter be described with reference to the accompanying drawings. Throughout the drawings, the numeral 1 designates a starter motor which is, as in the prior art, composed of a motor unit 2 rotated by turning ON a starter switch (not illustrated), a deceleration unit 3, a governor unit 4 a unidirectional rotary clutch 5 in which the present invention is embodied, a ring gear 6 provided on the side of an engine and a pinion gear 7 engageable with and disengageable from ring gear 6.

The unidirectional rotary clutch 5 essentially consists of: a clutch inner 8 connectively interlocking with a motor shaft; a clutch outer 9 connectively interlocking with pinion gear 7; clutch rollers 10 so accommodated in roller groove chambers 9a recessed in an inner pripheral portion of clutch outer 9 as to be interposed between clutch inner 8 and clutch outer 9; and elastic members 11 for biasing clutch rollers 10. When clutch inner 8 rotates in accordance with driving of motor unit 2, each clutch roller 10 moves on the lower oblique side (toward the small diameter, i.e., on the narrower spacing side with respect to clutch inner 8) of a tapered surface 9b obliquely shaped in roller groove chamber 9a, whereby clutch roller 10 is tightly wedged inbetween clutch inner 8 and clutch outer 9. The power is thus imparted to clutch outer 9. With the reverse rotation, each clutch roller 10 moves on the upper oblique side of tapered surface 9b, with the result that each clutch roller 10 loosely rotates. The propagation of power is thus cut off.

Roller groove chambers 9a in the unidirectional rotary clutch are filled with grease the primary component of which may be commonly-used hydrocarbon fats and oils. Added to the fats and oils are molybdenum dithiocarbamate of 0.5% by weight and fluorocarbon resin of the following percentages by weight which includes polytetrafluoroethylene resin and polyfluoroethylene-propylene resin. The added substance is further promoted by lithium soap, thus producing the grease. With the thus produced grease employed in the starter motor, some examinations and experiments on lubricity as well as on durability have been made. The results are exhibited in the following Table.

Before preforming such experiments, there is prepared a normally required amount of grease (the same amount of grease is applied to all the experiments) thoroughly permeating in the unidirectional rotary clutch. Then, the performance test on the durability is effected. The durability test starts with a step of actuating the engine by turning ON a starter swtich. Subsequently, the starter switch is turned OFF after maintaining an overrun state for 5 sec. These steps are repeated, and the number of repetitions is measured just to the point when the unidirectional rotary clutch malfunctions, i.e., when an obstacle to the propagation of power occurs at the starting of the engine.

TABLE

| No. | Kind of additives | Amount of addition (% by weight) | Results of durability test (Number) |
|-----|-------------------|----------------------------------|-------------------------------------|
| 1 | A | 3.0 | about 12000 |
| 2 | A | 5.0 | about 25000 |
| 3 | A | 10.0 | >30000 |
| 4 | A | 15.0 | >30000 |
| 5 | A | 20.0 | >30000 |
| 6 | B | 10.0 | >30000 |
| 7 | — | 0.0 | about 8000 |

(Note that the additive A represents tetrafuoroethylene resin, while B designates fluoroethylene-propylene resin)

Judging from the results given in the Table, it can be observed that the grease to which fluorocarbon resinous agent is added is superior in durability to another type of grease with no such addition (the test case No. 7 in the Table). It is obvious that the present invention has high effectiveness. When fluorocarbon resinous agent of 20% by weight is added to the grease (the test case No. 5), the viscosity of the grease increases at lower temperatures (the test is peformed at lower temperatures than, e.g., 10° C. below the freezing point). It is also observed that the increment in viscosity serves to hinder smooth movement of the clutch roller when overrun occurs, and hence tends to decrease the delay in cutoff of power propagation. However, there arises no problem when using the grease having an addition of less than 15% by weight. This fact was confirmed by a separately performed lower temperature test.

As a result, the durability of the unidirectional rotary clutch in the starter motor can be improved with certainty by employing the grease to which fluorocarbon resinous agent is added. Therefore, in sharp contrast with the difficulty inherent in the prior art, it is possible to flexibly set dimensional elements such as an inclined angle of tapered surface, a roller diameter and an outside diameter of clutch inner. This advantage further provides to a remarkable increase in degree of freedom in design, and at the same time the control over the accuracy of products can be facilitated. High reliability can therefore be obtained.

Although the illustrative embodiment of the present invention has been described in greater detail with reference to the accompanying drawings, it is to be understood that the invention is not limited to this precise embodiment. Various changes or modifications may be effected therein by one skilled in the art without departing from the scope or spirit of the invention.

What is claimed is:

1. A unidirectional rotary clutch in a starter motor, comprising:
a clutch inner connectively interlocking wih a motor unit on a power conveying route leading from said motor unit to a pinion gear which disengageably engages with a ring gear provided on the side of an engine;
a clutch outer connectively interlocking with said pinion gear;
a clutch roller biased by an elastic member incorporated into a roller groove chamber formed between said clutch inner and said clutch outer, so as to propagate power during forward rotation of said motor unit but to cut off the propagation of power in the case of reverse rotation, said roller groove chamber being filled with grease comprised of hydrocarbon fats and oils as a primary component and fluorocarbon resinous agent as a secondary component.

2. The clutch as set forth in claim 1, wherein said grease comprises 5.0 to 15.0% by weight of said fluorocarbon resinous agent.

* * * * *